(12) United States Patent
Yeh et al.

(10) Patent No.: US 11,360,360 B2
(45) Date of Patent: Jun. 14, 2022

(54) DISPLAY PANEL

(71) Applicant: HANNSTAR DISPLAY CORPORATION, Taipei (TW)

(72) Inventors: Cheng-Yen Yeh, Taichung (TW); I-Hsuan Chen, Kaohsiung (TW); Guang-Shiung Chao, Tainan (TW); Mu-Kai Kang, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 114 days.

(21) Appl. No.: 16/900,983

(22) Filed: Jun. 14, 2020

(65) Prior Publication Data
US 2021/0011325 A1 Jan. 14, 2021

(30) Foreign Application Priority Data
Jul. 8, 2019 (CN) .......................... 201910610419.1

(51) Int. Cl.
*G02F 1/1345* (2006.01)
*G02F 1/1333* (2006.01)

(52) U.S. Cl.
CPC ...... *G02F 1/13458* (2013.01); *G02F 1/13338* (2013.01); *G02F 1/13454* (2013.01)

(58) Field of Classification Search
CPC combination set(s) only.
See application file for complete search history.

(56) References Cited

U.S. PATENT DOCUMENTS

| 10,775,953 | B2* | 9/2020 | Yeh ....................... G06F 3/0443 |
| 2004/0165138 | A1 | 8/2004 | Hwang |
| 2011/0018571 | A1* | 1/2011 | Kim ...................... G02F 1/1345 324/760.02 |
| 2018/0069067 | A1* | 3/2018 | Oh ......................... H05K 1/181 |
| 2018/0141181 | A1* | 5/2018 | Nakanishi ................ B24B 9/14 |
| 2018/0269269 | A1 | 9/2018 | Kim |
| 2018/0329544 | A1 | 11/2018 | Yeh |
| 2018/0338377 | A1 | 11/2018 | Zuo |

(Continued)

FOREIGN PATENT DOCUMENTS

| CN | 205609530 U | 9/2016 |
| CN | 106873222 A | 6/2017 |
| CN | 107422553 A | 12/2017 |

(Continued)

*Primary Examiner* — Van N Chow
(74) *Attorney, Agent, or Firm* — Winston Hsu

(57) ABSTRACT

The present invention provides a display panel including a substrate, first pads, second pads, third pads, an integrated circuit chip, and a flexible printed circuit board. The substrate includes a display region and a non-display region. The first pads are disposed in the non-display region and include display signal pads used for transmitting display signals. The second pads are disposed in the non-display region, at least a portion of the second pads are disposed along a first direction, and the second pads are disposed closer to an edge of the substrate than the first pads. The third pads are disposed in the non-display region and along the first direction, and the third pads are electrically connected to the corresponding second pads. The integrated circuit chip covers and is electrically connected to the first pads and the second pads. The flexible printed circuit board is electrically connected to the third pads.

9 Claims, 6 Drawing Sheets

(56) References Cited

U.S. PATENT DOCUMENTS

2019/0305053 A1   10/2019  Lin
2020/0210041 A1    7/2020  Liu

FOREIGN PATENT DOCUMENTS

| CN | 108388054 A |  8/2018 |
| CN | 109032416 A | 12/2018 |
| CN | 109445649 A |  3/2019 |
| EP | 2 930 557 A2 | 10/2015 |
| TW | 200634366 | 10/2006 |

* cited by examiner

DISPLAY PANEL

CROSS REFERENCE TO RELATED APPLICATION

This application claims priority of China Application No. 201910610419.1, filed on Jul. 8, 2019. The entirety of the above-mentioned patent application is incorporated by reference herein and made a part of this specification.

BACKGROUND OF THE INVENTION

1. Field of the Invention

The present invention relates to a display panel, and more particularly, to a display panel having narrow border design.

2. Description of the Prior Art

A display panel is formed by two substrates and a plurality of layers with various electrical components disposed between the substrates. Since display panels are thin and light, have low power consumption and no radiation pollution, they are widely used in various portable or wearable electronic products such as notebooks, smart phones and watches, as well as vehicle displays, to provide more convenient information transmission and display.

In the non-display region of the conventional display panel, the width of the bottom border of the display panel cannot be effectively reduced due to the limit of the bonding technology in the back-end process. Therefore, the issue of reducing the width of the bottom border of the display panel and achieving the narrow border design is one of the technical problems to be solved at present.

SUMMARY OF THE INVENTION

The technical problem to be solved by the present invention is that the width of the bottom border of the display panel cannot be effectively reduced due to the limit of the bonding technology in the back-end process at present.

To solve the above technical problem, the present invention provides a display panel which includes a substrate, a plurality of first pads, a plurality of second pads, a plurality of third pads, an integrated circuit chip, and a flexible printed circuit board. The substrate includes a display region and a non-display region, wherein the non-display region is disposed on at least one side of the display region. The first pads are disposed in the non-display region, wherein the first pads include a plurality of display signal pads, and the display signal pads are used for transmitting a plurality of display signals to a plurality of sub-pixels in the display region. The second pads are disposed in the non-display region, wherein at least a portion of the second pads are arranged along a first direction, and the second pads are disposed closer to an edge of the substrate than the first pads. The third pads are disposed in the non-display region and arranged along the first direction, wherein the third pads are electrically connected to the second pads corresponding to the third pads. The integrated circuit chip is disposed in the non-display region, wherein the integrated circuit chip covers and is electrically connected to the first pads and the second pads. The flexible printed circuit board is electrically connected to the third pads.

In the non-display region of the display panel in the present invention, the third pads are disposed on two sides of the integrated circuit chip (according to the first direction), the distance between the edge of the substrate and the edge of the integrated circuit chip can therefore be reduced, and the width of the bottom border of the display panel can be reduced as well. For example, the width of the bottom border can be reduced to 2.6 millimeters to 2.85 millimeters. In addition, since the second pads and the third pads can be arranged along the first direction, and the first portion of the second pads (used for electrically connecting the gate driver circuit) are disposed closer to the first pads than the second portion of the second pads (used for electrically connecting the third pads) in the first direction, the traces electrically connected to the third pads and the traces electrically connected to the gate driver circuit can be separated from each other and without crossing each other, thereby avoiding the interference between different signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
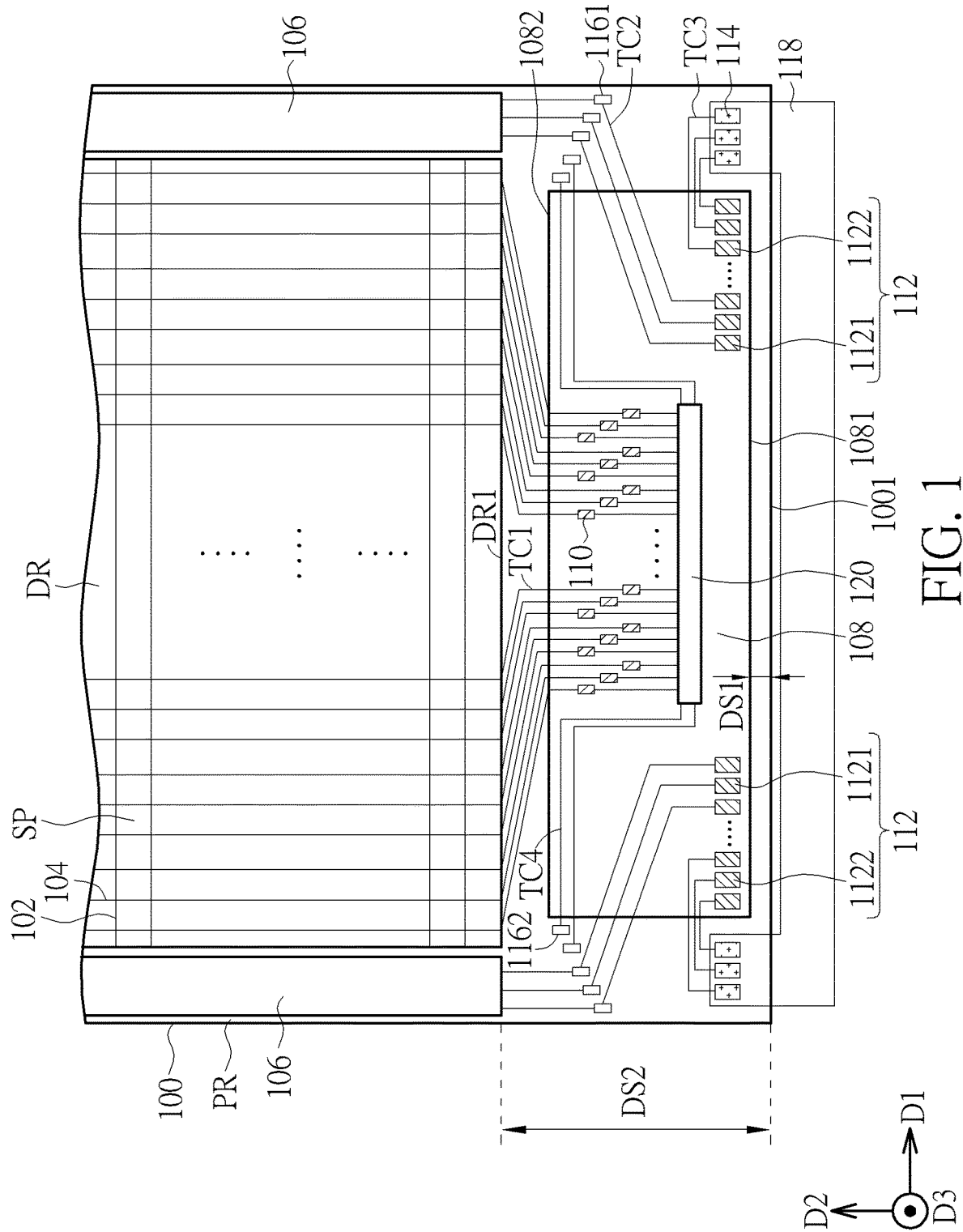
FIG. 1 is a schematic diagram illustrating a partial top view of a display panel according to a first embodiment of the present invention.

To provide a better understanding of the present invention to those skilled in the technology, embodiments will be detailed as follows. The embodiments of the present invention are illustrated in the accompanying drawings to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

Referring to FIG. 1, it is a schematic diagram illustrating a partial top view of a display panel according to a first embodiment of the present invention. A display panel 10 of this embodiment can be a liquid crystal display panel for example, but not limited thereto. The display panel 10 of the present invention can be other suitable types of display panels. As shown in FIG. 1, the display panel 10 includes a substrate 100. The substrate 100 includes a display region DR and a non-display region PR disposed on at least one side of the display region DR. In this embodiment, the non-display region PR surrounds the display region DR, but not limited thereto. The substrate 100 may be a rigid substrate such as glass substrate, plastic substrate, quartz substrate, or sapphire substrate, or may be a flexible substrate including polyimide (PI) material or polyethylene terephthalate (PET) material, but not limited thereto. The display panel 10 includes a plurality of scan lines 102 and a plurality of data lines 104, the scan lines 102 can extend in a first direction D1, the extending direction of the data lines 104 may not be parallel to the first direction D1, the data lines 104 can extend in a second direction D2, and the scan lines 102 can cross the data lines 104 to define a plurality of sub-pixels SP, but not limited thereto. The first direction D1 can be perpendicular to the second direction D2 in this embodiment, but not limited thereto.

The display panel 10 of this embodiment includes at least one gate driver circuit 106 and an integrated circuit (IC) chip 108 disposed on the substrate 100 and in the non-display region PR, and the gate driver circuit 106 can be electrically connected to the integrated circuit chip 108. The display panel 10 of this embodiment may include two gate driver circuits 106 respectively disposed on two sides of the display region DR in the first direction D1, or the display region DR may be disposed between two gate driver circuits 106, but not limited thereto. The location and number of the gate driver circuits 106 may be adjusted according to different requirements. In other embodiments, the display panel 10 may include one gate driver circuit 106 disposed on one side of the display region DR. The gate driver circuit 106 may include a plurality of shift registers and a plurality of signal lines for example, but not limited thereto. In addition, each of the scan lines 102 in the display region DR may be electrically connected to at least one of the gate driver circuits 106, and each of the gate driver circuits 106 may output scan signals to the corresponding scan lines 102. In this embodiment, two gate driver circuits 106 can respectively be electrically connected to the integrated circuit chip 108, control signals (such as start signals and/or clock signals) provided by the integrated circuit chip 108 can be transmitted to the gate driver circuits 106, and the gate driver circuits 106 can operate and output the scan signals to the corresponding scan lines 102 in the display region DR. In this embodiment, the gate driver circuits 106 are gate driver on array (GOA) circuit structures, but not limited thereto. In some variant embodiments, the gate driver circuits 106 can be manufactured as chips, and these chips can be disposed on the substrate 100 or disposed on the flexible or rigid circuit board which is further disposed on the substrate 100

In this embodiment, the integrated circuit chip 108 can be disposed on one side of the display region DR and include source driver circuits, but not limited thereto. In other embodiments, the integrated circuit chip 108 may further include a touch sensing circuit. The integrated circuit chip 108 may be disposed on the substrate 100 in the form of a chip or system on glass (SOG), but not limited thereto. In this embodiment, the integrated circuit chip 108 can output display signals (such as data signals) to the data lines 104 and the control signals to the gate driver circuits 106, but not limited thereto. In other embodiments, the integrated circuit chip 108 may further transmit and/or receive touch sensing signals.

In addition, the display panel 10 further includes a plurality of first pads 110, a plurality of second pads 112, and a plurality of third pads 114. The first pads 110, the second pads 112, and the third pads 114 can be disposed on the substrate 100 and in the non-display region PR. In the second direction D2, the first pads 110 can be disposed close to an edge DR1 of the display region DR. The first pads 110 may be arranged in three first pad rows along the first direction D1, but the number of first pad rows is not limited thereto. In some embodiments, the first pads 110 in adjacent two first pad rows may not overlap with each other in the second direction D2. In some embodiments, the first pads 110 in adjacent two first pad rows may partially overlap with each other in the second direction D2, but not limited thereto. In addition, the first pads 110 can be IC output pads and include a plurality of display signal pads, and the display signal pads can be used for transmitting a plurality of display signals (such as data signals) to the sub-pixels SP in the display region DR, but not limited thereto. For example, the display panel 10 further includes a plurality of traces TC1 disposed in the non-display region PR, the data lines 104 in the display region DR may be extended to the non-display region PR via these traces TC1, and each of the data lines 104 may be electrically connected to the corresponding first pad 110. Additionally, the integrated circuit chip 108 can output the display signals (such as data signals) to the data lines 104 and the sub-pixels SP in the display region DR via the first pads 110 and the traces TC1. In other embodiments, a portion of the first pads 110 may be touch signal pads, each of the touch signal pads may be electrically connected to a touch signal line in the display region DR via the traces TC1. In addition, one end of each of the touch signal lines may be electrically connected to one of the touch electrodes, and therefore the touch signal pads can transmit touch signals to the touch electrodes in the display region DR via the traces TC1 and the touch signal lines.

At least a portion of the second pads 112 can be arranged along the first direction D1 or along an edge 1081 of the integrated circuit chip 108, but not limited thereto. In the second direction D2, the second pads 112 are disposed closer to an edge 1001 of the substrate 100 than the first pads 110. In this embodiment, the second pads 112 are disposed on two sides of the first pads 110 in the first direction D1, but not limited thereto. In this embodiment, the second pads 112 are divided into a first portion and a second portion, the first portion of the second pads (e.g., the second pads 1121) are disposed between the second portion of the second pads (e.g., the second pads 1122) and the first pads 110 in the first direction D1, and the second pads 1121 (the first portion of the second pads) and the second pads 1122 (the second portion of the second pads) are both arranged along the first direction D1. For example, as shown in FIG. 1, the second pads 1121 (the first portion of the second pads) and the second pads 1122 (the second portion of the second pads) may be arranged in a row, but not limited thereto. Each of the second pads 1121 (the first portion of the second pads) is electrically connected to one of the gate driver circuits 106. As shown in FIG. 1, the display panel 10 further includes a plurality of traces TC2 disposed in the non-display region PR, and each of the second pads 1121 can be electrically connected to the corresponding gate driver circuit 106 via the corresponding trace TC2. Therefore, the integrated circuit chip 108 can output the control signals to the gate driver circuits 106 via the second pads 1121 and the traces TC2.

In this embodiment, the display panel 10 further includes a plurality of test pads 1161 disposed on the substrate 100 and in the non-display region PR. For example, each of the test pads 1161 may be disposed between the corresponding gate driver circuit 106 and one of the second pads 1121, and each of the test pads 1161 may be electrically connected to one of the traces TC2, but not limited thereto. Therefore, test signals can be provided through the test pads 1161 to the corresponding gate driver circuit 106 in the test stage of the display panel 10.

The third pads 114 can be arranged along the first direction D1 or an edge 1001 of the substrate 100, but not limited thereto. The third pads 114 can be disposed on one side of the second pads 112, and the second pads 112 can be closer to the first pads 110 than the third pads 114 in the first direction D1. As shown in FIG. 1, the first pads 110, the second pads 112, and the third pads 114 may not overlap with each other in the second direction D2, but not limited thereto. For example, in this embodiment, the projection areas of portions of the first pads 110, the second pads 112, and/or the third pads 114 may overlap with each other when they are projecting along the second direction D2. For another example, in this embodiment, the projection areas of the first pads 110, the second pads 112, and the third pads 114 may not overlap with each other when they are projecting along the third direction D3, but not limited thereto. In addition, the third pads 114 can be electrically connected to the second pads 112 corresponding to the third pads 114. As shown in FIG. 1, each of the third pads 114 can be electrically connected to one of the second pads 1122 (the second portion of the second pads) corresponding thereto. For example, the display panel 10 further includes a plurality of traces TC3 disposed in the non-display region PR, and each of the third pads 114 can be electrically connected to the corresponding second pad 1122 via the corresponding trace TC3.

As shown in FIG. 1, the integrated circuit chip 108 covers and is electrically connected to the first pads 110 and the second pads 112. For example, the integrated circuit chip 108 may include a plurality of pads disposed on the surface of the integrated circuit chip 108, and at least a portion of the pads are disposed corresponding to and electrically connected to the first pads 110 and the second pads 112. In addition, the display panel 10 further includes a flexible printed circuit board 118 electrically connected to the third pads 114. In this embodiment, the second pads 1122 may be IC input pads, and the flexible printed circuit board 118 can provide signals from power lines or interfaces to the integrated circuit chip 108 via the third pads 114, the traces TC3, and the second pads 1122, but not limited thereto.

In addition, the display panel 10 further includes a cell test circuit 120 disposed in the non-display region PR, and the cell test circuit 120 is disposed between the first pads 110 and the edge 1081 of the integrated circuit chip 108 in the second direction D2. As shown in FIG. 1, the integrated circuit chip 108 further covers the cell test circuit 120. The cell test circuit 120 can be electrically connected to the corresponding test pads 1162 via a plurality of traces TC4. The cell test circuit 120 includes a plurality of switches, and the switches are respectively coupled to the corresponding first pads 110 (i.e., the pads electrically connected to data lines 104). Each of the switches can be a thin film transistor for example, and the test signals can be transmitted to the corresponding data lines 104 or sub-pixels SP via the test pads 1162 and the switches to test whether the panel is abnormal.

It should be noted that numbers of the pads, traces, test pads, scan lines, data lines, and sub-pixels in this embodiment are not limited to that shown in FIG. 1. In addition, materials of the pads, traces, test pads, scan lines, and data lines may include conductive materials, such as metal, but not limited thereto.

In the display panels of some of the embodiments, the third pads 114 (the pads electrically connected to the flexible printed circuit board) are disposed below the integrated circuit chip 108 (according to the second direction D2) or between the edge 1001 of the substrate 100 and the edge 1081 of the integrated circuit chip 108. However, in this embodiment, the third pads 114 are disposed on two sides of the integrated circuit chip 108 (according to the first direction D1), the distance DS1 between the edge 1001 of the substrate 100 and the edge 1081 of the integrated circuit chip 108 can therefore be reduced, and the width DS2 of the bottom border of the display panel 10 can be reduced as well. For example, the width DS2 of the bottom border can be reduced to 2.6 millimeters to 2.85 millimeters, but not limited thereto. In addition, in this embodiment, since the second pads 112 and the third pads 114 are arranged along the first direction D1, and the second pads 1121 (the first portion of the second pads) are disposed closer to the first pads 110 than the second pads 1122 (the second portion of the second pads) in the first direction D1, the traces TC2 and the traces TC3 can be separated from each other in the non-display region PR without crossing each other, thereby avoiding the interference between different signals.

In another aspect, in the display panels of some of the embodiments, the cell test circuit 120 is disposed below the integrated circuit chip 108 or between the edge 1001 of the substrate 100 and the edge 1081 of the integrated circuit chip 108 in the second direction D2, or the cell test circuit 120 is not covered by the integrated circuit chip 108. Under this circumstance, a cutting process is required to separate the cell test circuit 120 from the display panel after the tests of panel is completed. However, in this embodiment, the first pads 110 are disposed close to the display region DR and the lengths of the traces TC1 are shortened to create additional space under the integrated circuit chip 108 (according to a third direction D3 perpendicular to the surface of the substrate 100), and the cell test circuit 120 can be disposed under the integrated circuit chip 108 so that the cell test circuit 120 can be covered by the integrated circuit chip 108. Accordingly, additional cutting process is not required to separate the cell test circuit 120 from the display panel 10 in this embodiment, thereby saving time and cost.

The display panel of the present invention is not limited to the aforementioned embodiment. The following description continues to detail other embodiments or variant embodiments. To simplify the description and show the difference between other embodiments, variant embodiments and the above-mentioned embodiment, identical components in each of the following embodiments are marked with identical symbols, and the identical features will not be redundantly described.

Figure 2:
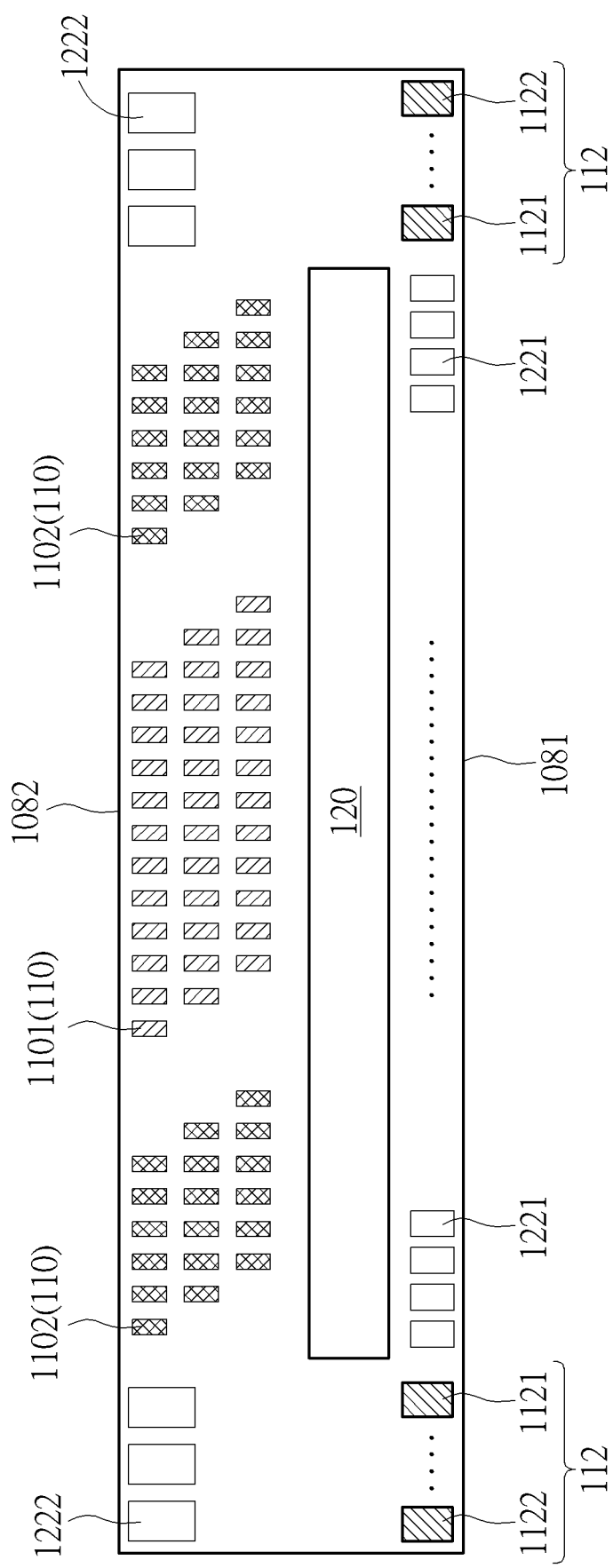
FIG. 2 is a schematic diagram illustrating a partial top view of a display panel according to a second embodiment of the present invention.
Figure 3:
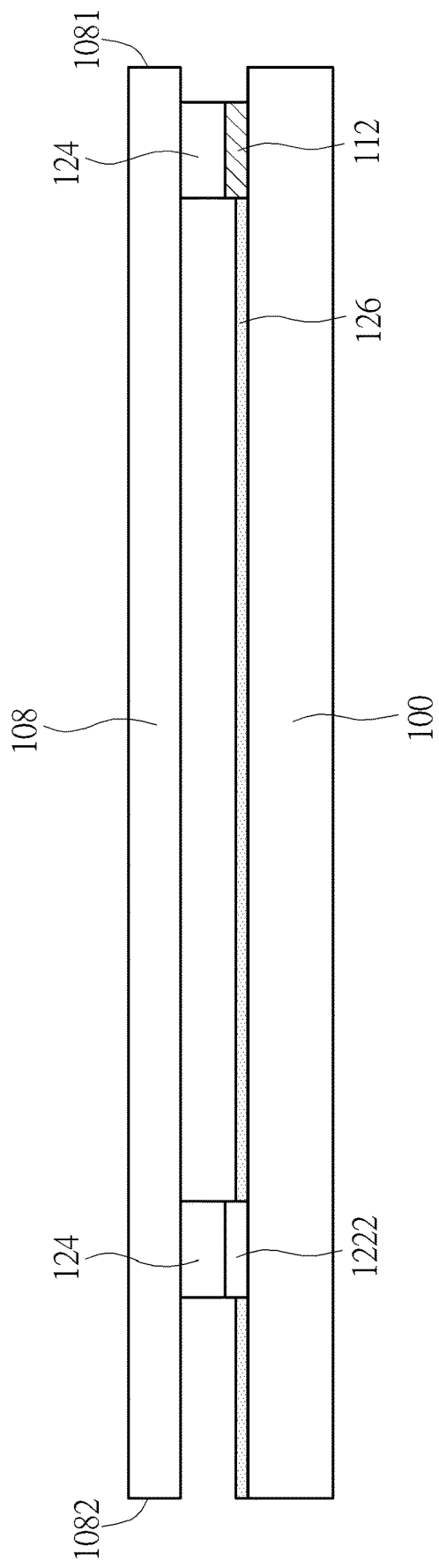
FIG. 3 is a schematic diagram illustrating a partial cross-sectional view of the display panel according to the second embodiment of the present invention.

Referring to FIG. 2 and FIG. 3, FIG. 2 is a schematic diagram illustrating a partial top view of a display panel according to a second embodiment of the present invention, and FIG. 3 is a schematic diagram illustrating a partial cross-sectional view of the display panel according to the second embodiment of the present invention. For simplifying the drawings and for ease of comprehension, FIG. 2 shows the integrated circuit chip 108, the cell test circuit 120, and the pads in the non-display region PR and omits the traces and the test pads. Different from the first embodiment, the display panel 10 of this embodiment can further include the touch sensing function. As shown in FIG. 2, the first pads 110 in the display panel 10 of this embodiment include the display signal pads 1101 and a plurality of touch signal pads 1102. For example, a plurality of touch signal lines can extend from the non-display region PR into the display region DR (similar to the data lines 104 in FIG. 1), one end of each of the touch signal lines can be electrically connected to one of the touch signal pads 1102, and the other end of each of the touch signal lines can be electrically connected to one of the touch electrodes. Therefore, the touch signal pads 1102 can be used for transmitting a plurality of touch signals to the touch electrodes in the display region DR. In addition, the touch signal pads 1102 of this embodiment may be divided into two portions, and the display signal pads 1101 may be disposed between a portion of the touch signal pads 1102 and the other portion of the touch signal pads 1102 in the first direction D1, but not limited thereto.

In this embodiment, the display panel 10 further includes a plurality of dummy pads 1221 disposed in the non-display region PR and arranged along the first direction D1. For example, the dummy pads 1221 can be arranged along the edge 1081 of the integrated circuit chip 108, but not limited thereto. In another aspect, the dummy pads 1221 are disposed between the cell test circuit 120 and the edge 1081 of the integrated circuit chip 108 in the second direction D2. The dummy pads 1221 are disposed close to a first edge (such as the edge 1081) of the integrated circuit chip 108, the first pads 110 are disposed close to a second edge (such as an edge 1082) of the integrated circuit chip 108, and the first edge is opposite to the second edge. In addition, the integrated circuit chip 108 of this embodiment further covers the dummy pads 1221. Since the dummy pads 1221 and the first pads 110 are respectively disposed on two sides of the integrated circuit chip 108, the dummy pads 1221 and the first pads 110 can effectively support the integrated circuit chip 108.

In this embodiment, the display panel 10 further includes a plurality of dummy pads 1222 disposed in the non-display region PR and arranged along the first direction D1. For example, the second pads 112 are arranged along the first edge (such as the edge 1081) of the integrated circuit chip 108, the dummy pads 1222 are arranged along the second edge (such as the edge 1082) of the integrated circuit chip 108, and the first edge is opposite to the second edge. Additionally, the integrated circuit chip 108 of this embodiment further covers the dummy pads 1222. The dummy pads 1222 and the second pads 112 are respectively disposed on two sides of the integrated circuit chip 108. Since the region in which the dummy pads 1222 disposed has more traces passing through, the number of the dummy pads 1222 can be designed to be less than the number of the dummy pads 1221, the number of times that the traces change their extending direction to avoid the dummy pads 1222 can be reduced, thereby reducing the difficulty of the process. In another aspect, the dummy pads 1222 are designed to have larger areas (greater than areas of the dummy pads 1221 for example), and therefore the dummy pads 1222 and the second pads 112 can effectively support the integrated circuit chip 108. In addition, the dummy pads 1221 and/or dummy pads 1222 of this embodiment may be selectively disposed in the display panels of other embodiments.

For example, as shown in FIG. 3, the integrated circuit chip 108 includes a plurality of pads 124 disposed on the surface of the integrated circuit chip 108, and the pads 124 can be bonded to the corresponding dummy pads 1222 and second pads 112 on the substrate 100. Since the dummy pads 1222 and the second pads 112 are respectively disposed on two opposite sides of the integrated circuit chip 108, the dummy pads 1222 and the second pads 112 can effectively support the integrated circuit chip 108, and wires 126 (such as traces, signal lines, etc.) on the substrate 100 can be prevented from breaking when the integrated circuit chip 108 is inclined during bonding. Additionally, since the dummy pads 1222 and the second pads 112 are respectively disposed on two opposite sides of the integrated circuit chip 108, the dummy pads 1222 and the second pads 112 can be stressed uniformly to prevent incomplete fracture of the anisotropic conductive film (ACF) during bonding, thereby increasing the electrically connection between the pads 124 and the second pads 112. The above effects can also be applied to the dummy pads 1221 and the first pads 110, and they will not be redundantly described again.

Figure 4:
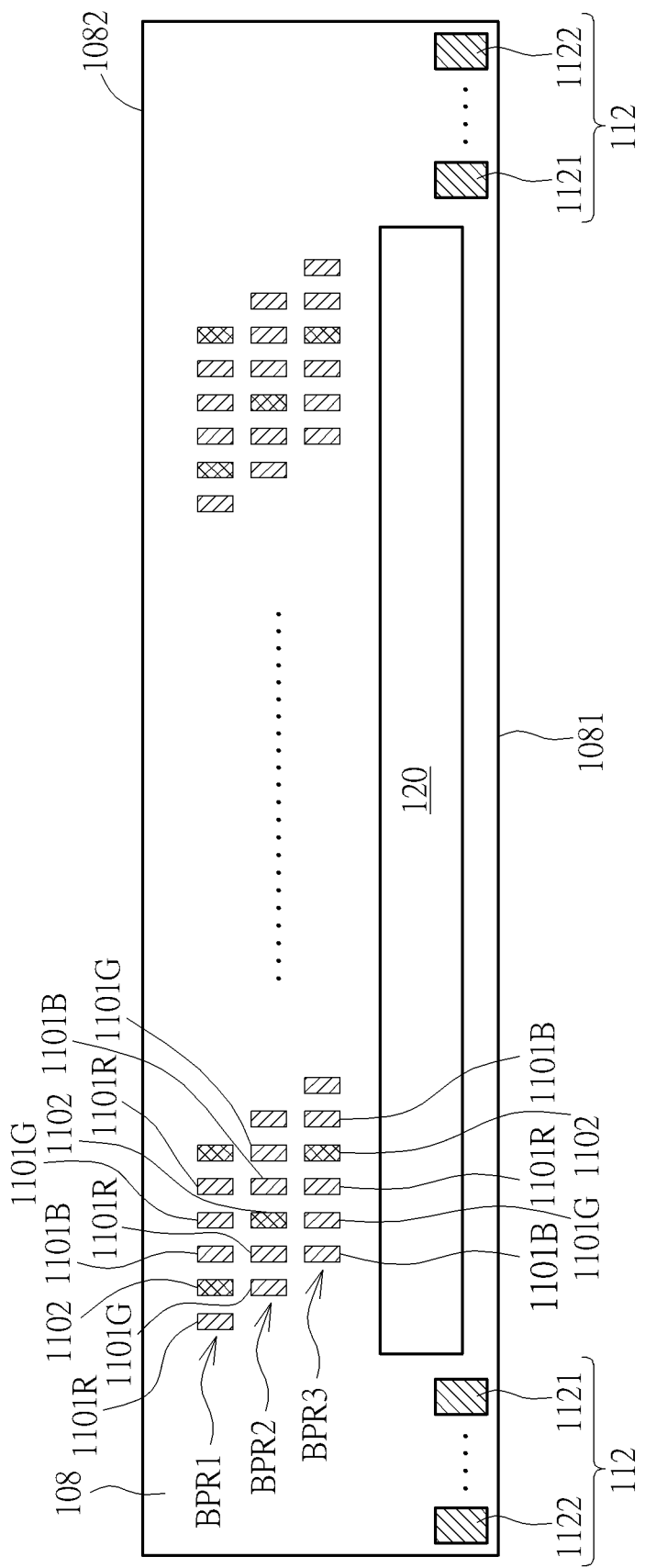
FIG. 4 is a schematic diagram illustrating a partial top view of a display panel according to a third embodiment of the present invention.

Referring to FIG. 4, it is a schematic diagram illustrating a partial top view of a display panel according to a third embodiment of the present invention. For simplifying the drawings and for ease of comprehension, FIG. 4 shows the integrated circuit chip 108, the cell test circuit 120, and the pads in the non-display region PR and omits the traces and the test pads. As shown in FIG. 4, it is different from the second embodiment that at least one of the touch signal pads 1102 is disposed between adjacent two of the display signal pads 1101 (e.g., the display signal pads 1101R, 1101G and 1101B), and the touch signal pads 1102 can be disposed among the display signal pads 1101 in this embodiment. For example, the touch signal pads 1102 and the display signal pads 1101 may be arranged in three pad rows, and each of the pad rows extends in the first direction D1. The arrangement of four pads of each pad row in the first direction D1 is described below. In the first pad row BPR1, the first pad can be a display signal pad 1101R used for transmitting a display signal to one of the red sub-pixels, the second pad can be a touch signal pad 1102 used for transmitting the touch signal to one of the touch electrodes, the third pad can be a display signal pad 1101B used for transmitting a display signal to one of the blue sub-pixels, the fourth pad can be a display signal pad 1101G used for transmitting a display signal to one of the green sub-pixels, the fifth pad may be another display signal pad 1101R used for transmitting a display signal to another one of the red sub-pixels, and the arrangement of subsequent pads in the first pad row BPR1 can have the same order as above.

In the second pad row BPR2, the first pad can be a display signal pad 1101G used for transmitting a display signal to one of the green sub-pixels, the second pad can be a display signal pad 1101R used for transmitting a display signal to one of the red sub-pixels, the third pad can be a touch signal pad 1102 used for transmitting the touch signal to one of the touch electrodes, the fourth pad can be a display signal pad 1101B used for transmitting a display signal to one of the blue sub-pixels, the fifth pad can be another display signal pad 1101G used for transmitting a display signal to another one of the green sub-pixels, and the arrangement of subsequent pads in the second pad row BPR2 can have the same order as above.

In the third pad row BPR3, the first pad can be a display signal pad 1101B used for transmitting a display signal to one of the blue sub-pixels, the second pad can be a display signal pad 1101G used for transmitting a display signal to one of the green sub-pixels, the third pad can be a display signal pad 1101R used for transmitting a display signal to one of the red sub-pixels, the fourth pad can be a touch signal pad 1102 used for transmitting a touch signal to one of the touch electrodes, the fifth pad can be another display signal pad 1101B used for transmitting a display signal to another one of the blue sub-pixels, and the arrangement of subsequent pads in the third pad row BPR3 can have the same order as above. However, the arrangement of the touch signal pads 1102 and the display signal pads 1101 is not limited to this embodiment.

Figure 5:
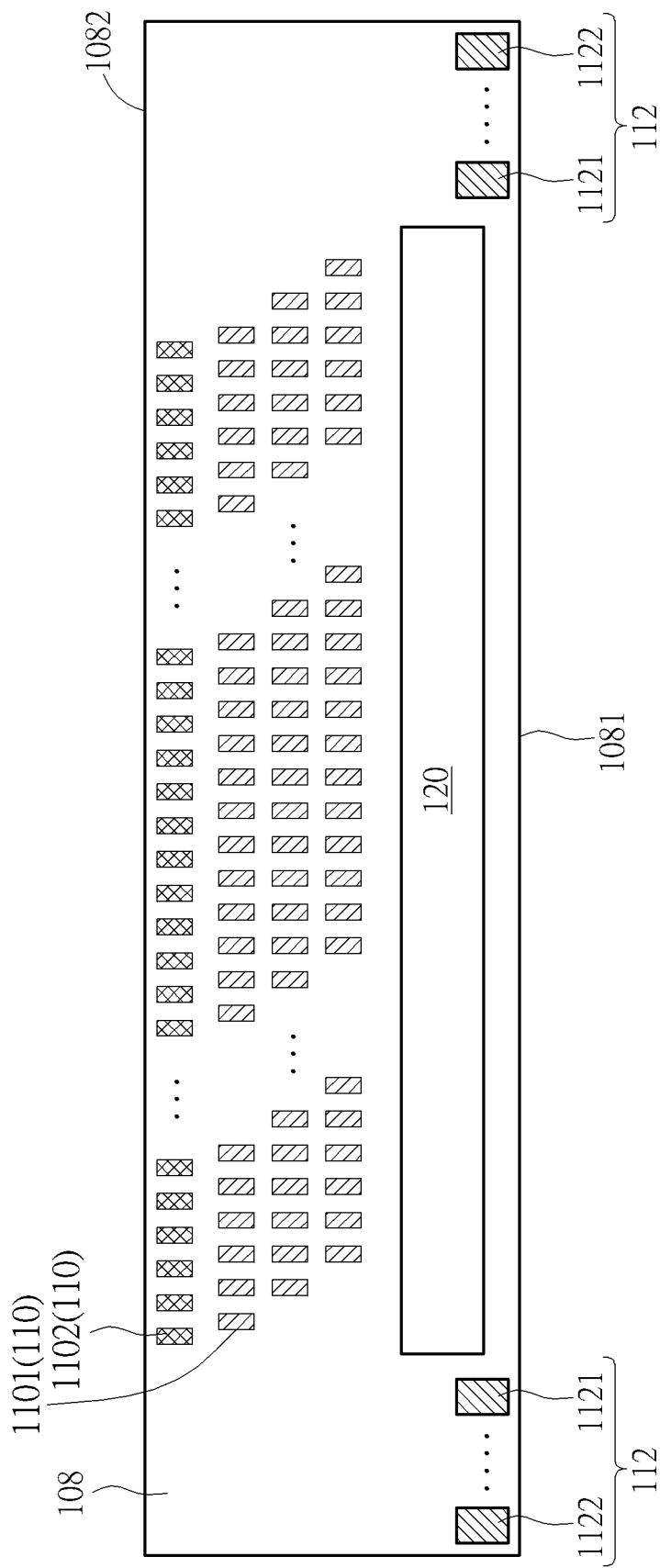
FIG. 5 is a schematic diagram illustrating a partial top view of a display panel according to a fourth embodiment of the present invention.
Figure 5:
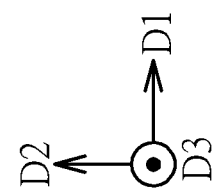

Referring to FIG. 5, it is a schematic diagram illustrating a partial top view of a display panel according to a fourth embodiment of the present invention. For simplifying the drawings and for ease of comprehension, FIG. 5 shows the integrated circuit chip 108, the cell test circuit 120, and the pads in the non-display region PR and omits the traces and the test pads. As shown in FIG. 5, it is different from the second embodiment that the touch signal pads 1102 are disposed between the edge 1082 of the integrated circuit chip 108 and the display signal pads 1101 in the second direction D2 in this embodiment. In another aspect, the touch signal pads 1102 can be disposed between the edge DR1 of the display region DR (shown in FIG. 1) and the display signal pads 1101 in the second direction D2 in this embodiment. Additionally, the touch signal pads 1102 can be arranged in a touch signal pad row along the first direction D1, and the display signal pads 1101 can be arranged in three display signal pad rows along the first direction D1. However, the arrangement of the touch signal pads 1102 and the display signal pads 1101 is not limited to this embodiment.

Figure 6:
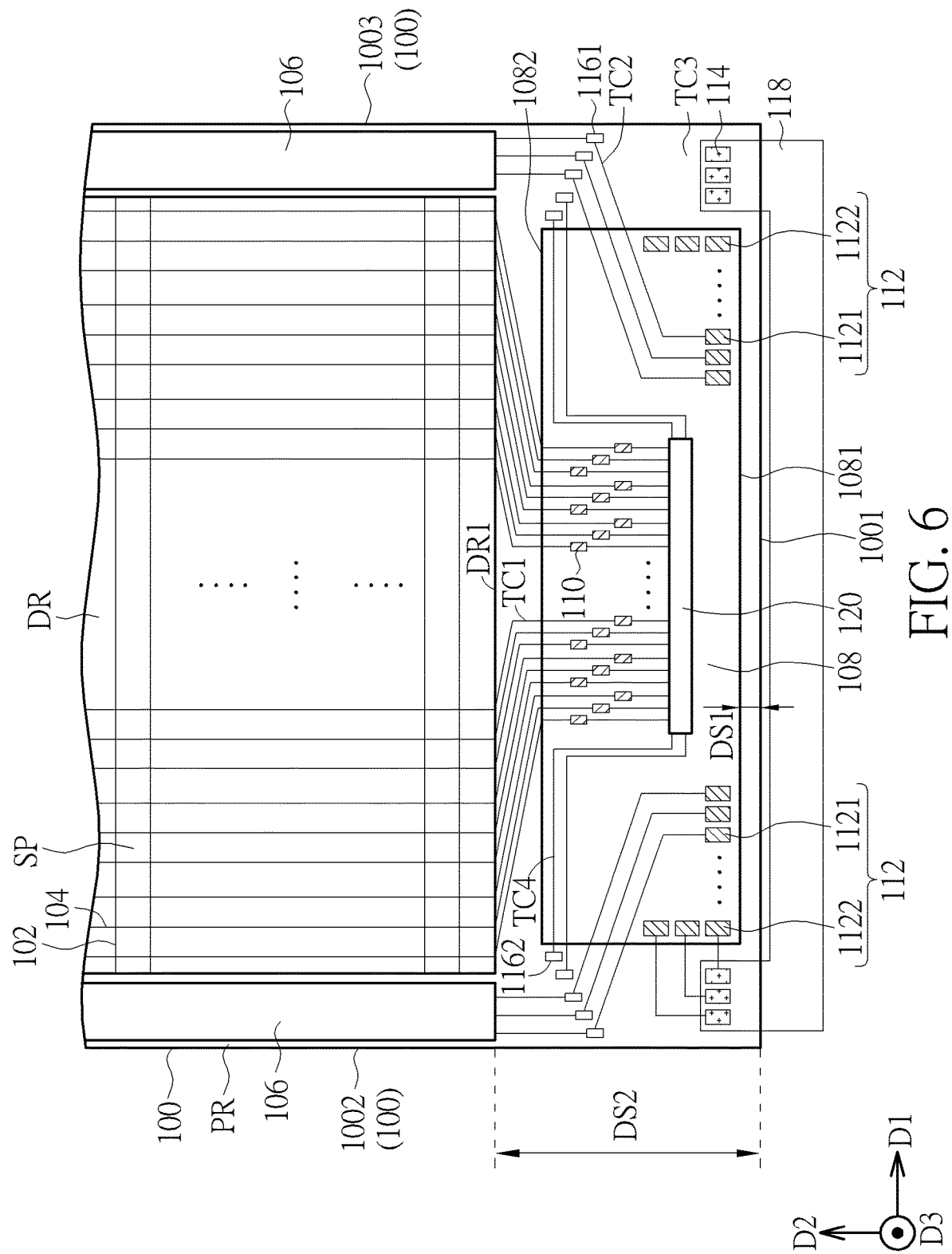
FIG. 6 is a schematic diagram illustrating a partial top view of a display panel according to a fifth embodiment of the present invention.

Referring to FIG. 6, it is a schematic diagram illustrating a partial top view of a display panel according to a fifth embodiment of the present invention. It is different from the first embodiment that the second pads 1121 (the first portion of the second pads) can be arranged along the first direction D1, the second pads 1122 (the second portion of the second pads) can be arranged along the second direction D2, but not limited thereto. For example, the second pads 1122 may be arranged in a column, and the second pads 1121 may be arranged in a row, but not limited thereto. Therefore, in this embodiment, the second pads 1121 (the first portion of the second pads) can be disposed closer to the edge 1001 of the substrate 100 in the second direction D2 than the first pads 110, and the second pads 1122 (the second portion of the second pads) can be disposed closer to an edge 1002 or an edge 1003 of the substrate 100 than the first pads 110 in the first direction D1. For example, the edge 1001 can be the bottom edge of the substrate 100, and the edge 1002 and the edge 1003 can be two edges on the left and right sides of the substrate 100. Although the second pads 1122 (the second portion of the second pads) of this embodiment are electrically connected to the third pads 114 as an example, the second pads 1122 arranged along the second direction D2 are not limited to be electrically connected to the third pads 114, and the second pads 1122 may be electrically connected to other components on the substrate 100. For example, a portion of the second pads 1122 (the second portion of the second pads) arranged along the second direction D2 may be electrically connected to other components on the substrate 100, and another portion of the second pads 1122 may be electrically connected to the third pads 114, but not limited thereto.

To sum up, in the non-display region of the display panel in the present invention, the third pads are disposed on two sides of the integrated circuit chip (according to the first direction), the distance between the edge of the substrate and the edge of the integrated circuit chip can therefore be reduced, and the width of the bottom border of the display panel can be reduced as well. For example, the width of the bottom border can be reduced to 2.6 millimeters to 2.85 millimeters. In addition, since the second pads and the third pads can be arranged along the first direction, and the first portion of the second pads (used for electrically connecting the gate driver circuit) are disposed closer to the first pads than the second portion of the second pads (used for electrically connecting the third pads) in the first direction, the traces electrically connected to the third pads and the traces electrically connected to the gate driver circuit can be separated from each other and without crossing each other, thereby avoiding the interference between different signals. In addition, the first pads are disposed close to the display region and the lengths of the traces electrically connected to the first pads are shortened to create additional space under the integrated circuit chip (according to the third direction), and the cell test circuit can be disposed under the integrated circuit chip so that the cell test circuit can be covered by the integrated circuit chip. Accordingly, additional cutting process is not required to separate the cell test circuit from the display panel in the present invention, thereby saving time and cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a substrate, comprising a display region and a non-display region, wherein the non-display region is disposed on at least one side of the display region;
   a plurality of first pads disposed in the non-display region, wherein the first pads comprise a plurality of display signal pads, and the display signal pads are used for transmitting display signals to a plurality of sub-pixels in the display region;
   a plurality of second pads disposed in the non-display region, wherein at least a portion of the second pads are arranged along a first direction, and the second pads are disposed closer to an edge of the substrate than the first pads;
   a plurality of third pads disposed in the non-display region and arranged along the first direction, wherein the third pads are electrically connected to the second pads corresponding to the third pads;
   an integrated circuit chip disposed on the substrate and in the non-display region, wherein the integrated circuit chip covers and is electrically connected to the first pads and the second pads, and the integrated circuit chip comprises a first edge and a second edge opposite to the first edge, the first edge and the second edge are extended along the first direction, the second edge is disposed between the first edge and the display region in a second direction, and the second direction is perpendicular to the first direction; and
   a flexible printed circuit board electrically connected to the third pads,
   wherein no other pads are disposed between the first pads and the first edge of the integrated circuit chip.

2. The display panel of claim 1, further comprising a cell test circuit disposed in the non-display region, wherein the cell test circuit is disposed between the first pads and the first edge of the integrated circuit chip in the second direction.

3. The display panel of claim 2, wherein the integrated circuit chip further covers the cell test circuit.

4. The display panel of claim 1, further comprising a plurality of dummy pads disposed in the non-display region and arranged along the first direction, wherein the second pads are arranged along the first edge of the integrated circuit chip, the dummy pads are arranged along the second edge of the integrated circuit chip.

5. The display panel of claim 1, wherein the second pads are divided into a first portion and a second portion, the first portion of the second pads are arranged along the first direction, the second portion of the second pads are arranged along the second direction, the first portion of the second pads are disposed between the second portion of the second pads and the first pads in the first direction, the first portion of the second pads are electrically connected to a gate driver circuit, and the second portion of the second pads are electrically connected to the third pads.

6. The display panel of claim 1, wherein the second pads are divided into a first portion and a second portion, the first portion of the second pads and the second portion of the second pads are arranged along the first direction, the first portion of the second pads are disposed between the second portion of the second pads and the first pads in the first direction, the first portion of the second pads are electrically connected to a gate driver circuit, and the second portion of the second pads are electrically connected to the third pads.

7. The display panel of claim 1, wherein the first pads further comprise a plurality of touch signal pads used for transmitting touch signals to a plurality of touch electrodes in the display region, and the display signal pads are disposed between a portion of the touch signal pads and another portion of the touch signal pads in the first direction.

8. The display panel of claim 1, wherein the first pads further comprise a plurality of touch signal pads used for transmitting touch signals to a plurality of touch electrodes in the display region, and at least one of the touch signal pads is disposed between adjacent two of the display signal pads.

9. The display panel of claim 1, wherein the first pads further comprise a plurality of touch signal pads used for transmitting touch signals to a plurality of touch electrodes in the display region, and the touch signal pads are disposed between an edge of the display region and the display signal pads in the second direction.

* * * * *